Oct. 16, 1934.  R. M. MAGNUSON  1,977,075
PISTON

Original Filed April 19, 1932

INVENTOR.
Roy. M. Magnuson.
BY
Philip A. Minnis
ATTORNEY.

Patented Oct. 16, 1934

1,977,075

UNITED STATES PATENT OFFICE 1,977,075

PISTON

Roy M. Magnuson, San Jose, Calif., assignor to Food Machinery Corporation, San Jose, Calif., a corporation of Delaware Application April 19, 1932, Serial No. 606,150
Renewed March 13, 1934

5 Claims. (Cl. 309—4)

This invention relates to piston assemblies for reciprocating pumps in which a movable packing cup is utilized as a piston or a part thereof. The invention is particularly concerned with the construction of a piston assembly of this character in such manner that it can readily be withdrawn and replaced through the head end of the pump cylinder.

Reciprocating pumps utilizing packing cups of the types above mentioned are well known in the art, but by way of illustrating the manifold benefits and advantages of the invention herein disclosed it may be said that heretofore the customary construction of such pumps has been such that removal and replacement of the packing has been required to be done from the crank end of the cylinder. This, in turn, necessitated the opening up of the crank case, thereby affording an opportunity for the entrance of dust, dirt, or other foreign material which would contaminate the oil and result in serious damage to the pump.

Moreover it is not only necessary to disconnect the connecting rod from the crank shaft in order to withdraw the packing from the cylinder, but considerable difficulty is apt to be met with in replacing the packing. The packing cup is necessarily over size so that it will tightly bear against the inner cylinder walls, and it must be positioned in the cylinder with its concave face disposed toward the head end. When the packing cup is to be inserted into the pump cylinder from the crank end it must, therefore, be compressed sufficiently to get it into the cylinder, and being very stiff it is oftentimes mutilated or otherwise damaged in the attempt to squeeze it into place.

By constructing the pump in accordance with the present invention, all of the above mentioned difficulties are avoided, since provision is made for removal and replacement of the piston assembly through the head end of the cylinder.

It is, accordingly, a principal object of the invention to provide a piston packing assembly for pumps, including a plunger packing so constructed as to permit of its withdrawal and replacement through the head end of the pump cylinder.

A further object is to provide a piston assembly including a cup shaped plunger packing, a holder therefor, and means for securing the packing to the holder in such manner as to facilitate its release from and replacement on the holder.

Various other objects and advantages, in addition to those specifically enumerated, will become apparent as the description proceeds in connection with the accompanying drawings, in which.

Figure 1:
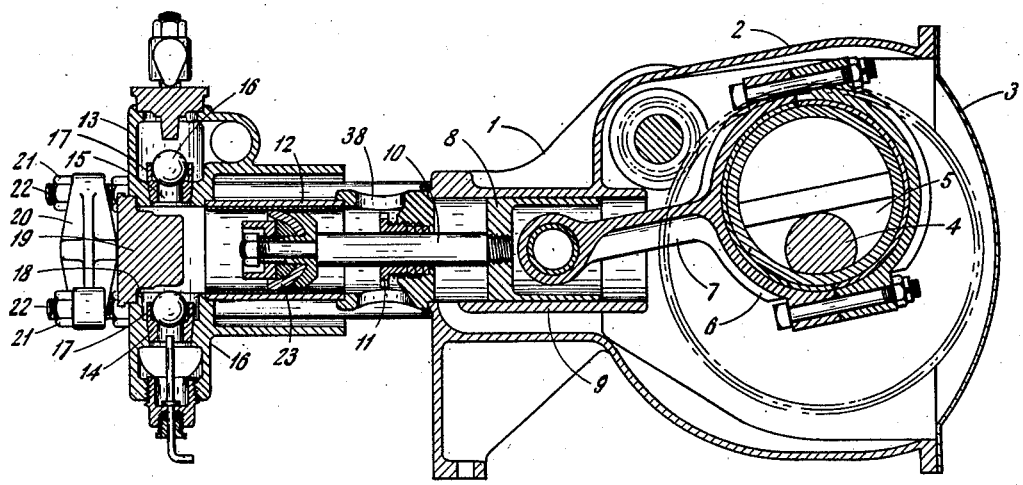
Figure 1 is a sectional view of a reciprocating pump of the plunger packing type embodying the features of the invention.

Referring first to Figure 1, the pump frame is indicated at 1 and integral therewith is a crank case 2 having a removable portion 3. A drive shaft 4 is provided with an eccentric portion 5 upon which is journalled the split bearing 6 of a connecting rod 7. A cross head 8, slidable in a guide 9, is pivotally attached to the opposite end of the connecting rod, and secured to the cross head is a plunger rod 10 operable through a bearing 11 to reciprocate the piston or plunger assembly, which is to be described hereinafter with more particularity.

To the pump cylinder 12 is secured a head 13 which forms an extension of the cylinder, and is provided with inlet and outlet ports 14 and 15, respectively, controlled by ball valves 16 confined in suitable cages 17. The head 13 is provided with an opening 18 through its top of the same or larger diameter than the cylinder diameter, and a closure cap 19 is seated in the opening and held in place by a clamp 20. Nuts 21, threaded to the outer ends of the bolts 22 projecting outwardly from the cylinder head and extending through bearings in the clamp 20, serve to hold the clamp against the cap 19, and may be unscrewed to permit of the removal of the clamp and cap when desired.

Figure 2:
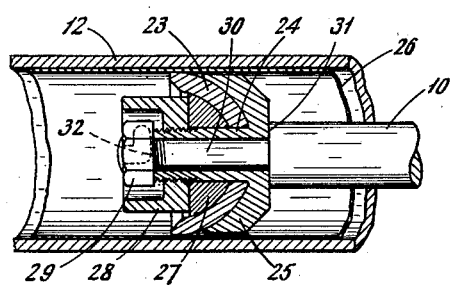
Figure 2 is an enlarged sectional view of a portion of the pump cylinder and the packing plunger assembly.

As best seen in Figure 2, the piston comprises a packing cup 23 formed of rubber, leather, or other suitable material or composition, and provided with a central opening fitted over a hollow projection or sleeve 24 extending from the forward face of a packing holder 25. Since the pump illustrated herein is especially designed for pumping liquids containing chemicals, abrasives or other impurities, and to this end is provided with a porcelain lining 26, the diameter of the holder 25 is somewhat less than the cylinder diameter, so as to provide for clearance. This would be unnecessary, of course, where the cylinder lining were metallic, in which case the holder might also act as a piston. A semi-spherical bearing block or packing washer 27 is seated against the concave side of the packing cup and a flanged collar 28, threaded to the outer end of the sleeve 24 and bearing against the washer 27, securely retains the packing cup in position on the holder 25.

The holder 25 and its associated packing cup 23, washer 27, and retaining collar 28, are releasably secured to the end of the plunger rod 10 by means of a nut 29 threaded on the reduced portion 30 of the plunger rod which extends through the bore of the sleeve 24. The nut 29 bears against the outer face of the sleeve 24 and retains the holder 25 against the shoulder 31 of the plunger rod.

Figure 3:
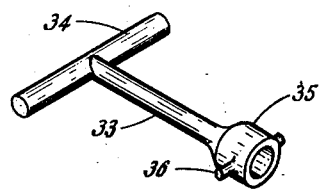
Figure 3 illustrates one form of pulling tool for use in removing the packing from the cylinder.

The collar 28 is provided with bayonet slots 32 for cooperation with a pulling tool such as illustrated in Figure 3 when it is desired to remove the packing from the cylinder. The pulling tool comprises a shank 33 having a handle 34 at one end and a socket 35 at the other, from which protrude the lugs 36 engageable with the bayonet slots 32 in the collar 28. The outer diameter of the socket 35 is such that it readily fits within the collar 28 and the inside diameter of the socket is such as to fit over the end of the reduced portion 30 of the plunger rod when the nut 29 is removed.

The manner of removing the packing from the pump cylinder will now be apparent. The nuts 21 are removed, releasing the cap 19 so that it may be removed. By means of a socket wrench or other suitable tool, the nut 29 is removed from the end of the plunger rod thereby freeing the holder 25, whereupon the socket 35 of the pulling tool may be inserted into the collar 28 so that the lugs 36 engage with the bayonet slots 32 and the holder and packing withdrawn from the cylinder through the opening 18 in the cylinder head. If, upon inspection, the packing 23 is found to be in need of replacement it is only necessary to unscrew the collar 28 from the sleeve 24 whereupon the washer 27 and packing may be removed and a new packing put in place on the holder. The provision of the washer 27 between the collar 28 and the packing 23 greatly facilitates the removal of the packing from the holder since the washer is not threaded to the sleeve 24. In the operation of the pump, particularly when it is used to pump certain kinds of liquids, it often happens that the packing "freezes" to its retaining members so that, where the packing is retained in place by a threaded nut without the interposition of an unthreaded washer, it becomes impossible to twist the nut and it is necessary to knock it off with a chisel or the like, in the course of which operation damage to the holder is likely to result.

When the holder, packing, washer, and retaining collar are reassembled, the assembly may be reinserted into the cylinder through the cylinder head and secured to the plunger rod 10 by the nut 29. No difficulty is encountered in forcing the assembly into the cylinder, since the packing cup is arranged with its convex side inwardly so that the application of force causes the packing to be contracted by the cylinder itself.

It is to be noted that the entire operation of removing and replacing the packing is carried out without disturbing the inlet and outlet valves, so that the pressure in the discharge line is not affected, and this becomes of considerable importance where the pump is delivering its output under high pressure or where pumping liquids to a distant or elevated point, as it avoids any loss of pressure or the contents of the discharge line or receiver.

Figure 5:
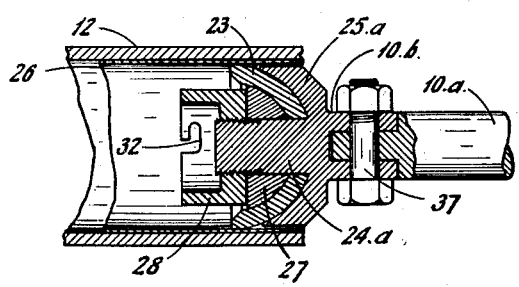
Figure 5 illustrates a modification.
Figure 4:
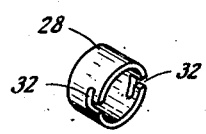
Figure 4 is a detail of a portion of the packing assembly.

Figure 5 illustrates a slightly modified form of packing assembly, wherein the plunger rod is made up of sections 10a and 10b secured together by a pin 37. The holder 25a is integral with one of the sections and is provided with a solid central projection 24a instead of the sleeve 24. The remaining elements are the same as shown in Figures 1 to 4. The manner of removing and replacing the modified form of packing assembly is the same as before, except that the assembly is released by removing the pin 37 so as to disconnect the adjacent sections of the plunger rod. Access may be had to the pin 37 by way of the aperture 38 in the pump frame.

Having now described my invention and in what manner the same may be used, what I claim as new and desire to secure by Letters Patent is:

1. A pump piston assembly comprising a packing holder having a central projection, a packing disposed adjacent said holder and surrounding the projection, a washer bearing against the packing, a nut threaded on said projection for securing the washer and packing to the holder, said nut being provided with means engageable by a pulling tool whereby the entire assembly may be removed from the head end of a pump cylinder.

2. A piston assembly for pumps, comprising a plunger rod having a reduced portion adjacent one end thereof, a packing holder slidably mounted on said reduced portion of the plunger rod, means for securing the holder in position on the rod, a packing cup secured to the holder with its concave surface facing forwardly away from the plunger rod, and means associated with said assembly and accessible from the concave side of the packing for engagement by a pulling tool for removal of the packing from the head end of a pump cylinder.

3. A piston assembly for pumps comprising a packing holder, a cup shaped plunger packing, means for releasably securing said packing to the holder, and means associated with said securing means and accessible from the concave side of the packing for engagement by a pulling tool for removal of the packing from the head end of a pump cylinder.

4. A piston assembly for pumps comprising a sectional plunger rod, a piston secured to one end of said rod, means associated with said piston and accessible from the forward side thereof for engagement by a pulling tool for removal from the head end of a pump cylinder, and means for releasably securing said plunger rod sections together whereby said piston and adjacent plunger rod section may be removed from the head end of a pump cylinder independently of the other section of the plunger rod.

5. A piston assembly for pumps, including a plunger rod having an abutment adjacent one end thereof, a packing holder slidably mounted on said plunger rod, means for securing the holder in position on the rod against said abutment, and a packing cup secured to the holder with its concave surface facing forwardly away from the plunger rod, and means associated with said assembly and accessible from the concave side of the packing for engagement by a pulling tool for removal of the packing from the head end of a pump cylinder.

ROY M. MAGNUSON.